United States Patent
Fan et al.

(10) Patent No.: US 12,014,026 B2
(45) Date of Patent: *Jun. 18, 2024

(54) BEHAVIOR BASED MENU ITEM RECOMMENDATION AND PRUNING

(71) Applicant: International Business Machines Corporation, Armonk, NY (US)

(72) Inventors: Long Fan, Xian (CN); Yang Yang, Xian (CN); Ye Fan, Xian (CN); Juan Wu, Xi'an (CN); Qi Mao, Xi'an (CN); Jing James Xu, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,751

(22) Filed: Apr. 21, 2023

(65) Prior Publication Data
US 2023/0251760 A1    Aug. 10, 2023

Related U.S. Application Data

(63) Continuation of application No. 17/569,689, filed on Jan. 6, 2022, now Pat. No. 11,714,527.

(51) Int. Cl.
*G06F 3/0482* (2013.01)
(52) U.S. Cl.
CPC .................. *G06F 3/0482* (2013.01)
(58) Field of Classification Search
CPC ..... G06F 3/0482; G06F 3/048; G06F 3/04842
See application file for complete search history.

(56) References Cited

U.S. PATENT DOCUMENTS

| 2004/0015500 | A1* | 1/2004 | Pugliese | G06F 3/0482 |
| | | | | 707/999.009 |
| 2010/0050128 | A1* | 2/2010 | Chiang | G06F 3/0482 |
| | | | | 715/847 |

FOREIGN PATENT DOCUMENTS

WO    WO-2012095900 A1 *  7/2012   ........... G06F 3/0482

OTHER PUBLICATIONS

Machine translation of Teshima, WO 2012095900 A1, combined with the published application. (Year: 2012).*
List of all IBM related dockets, 2023.

* cited by examiner

*Primary Examiner* — Dino Kujundzic
(74) *Attorney, Agent, or Firm* — Garg Law Firm, PLLC; Rakesh Garg; Kimberly Zillig

(57) ABSTRACT

Using a set of menu to key process mappings, historical menu usage data for an application is aggregated into aggregated key process usage data. A set of key process association rules, each comprising a consequent key process given a particular antecedent key process, is generated. From the set of key process association rules and a set of ranked menus by frequency of usage within each key process, a set of model menu recommendations is generated. According to an application usage history, a menu frequency ratio, and a confidence value of a modelled next menu, the set of menu recommendations is scored. A scored menu recommendation having a rank below a threshold rank is pruned from a set of menu items of the application ranked according to their scores. The pruned set of scored menu recommendations is presented for selection instead of the set of menu items.

20 Claims, 14 Drawing Sheets

Fig. 9

KEY PROCESS USAGE FREQUENCY AGGREGATION 820

| DATE | KP₁ | KP₂ | ... | KP₆ |
|---|---|---|---|---|
| D₁ | 50 | 40 | ... | 43 |
| ... | ... | ... | ... | ... |
| D_{n-1} | ... | ... | ... | ... |
| D_n | 64 | 58 | ... | 75 |

KEY PROCESS USAGE RANKING 830

| | MENU₁ | MENU₂ | ... | MENU_K |
|---|---|---|---|---|
| KP₁ | 8 | 0 | ... | 20 |
| KP₂ | 0 | 20 | ... | 0 |
| ... | ... | ... | ... | ... |
| KP₆ | 0 | 0 | ... | 0 |

ASSOCIATION RULES 910

| ANTECEDENTS | CONSEQUENTS | SUPPORT | CONFIDENCE |
|---|---|---|---|
| KP3 | KP1 | 60% | 90% |
| KP1 | KP3 | 60% | 88% |
| KP1, KP2 | KP4 | 50% | 80% |
| ... | ... | ... | ... |

MODEL MENU RECOMMENDATIONS 920

| CURRENT MENU | KP RECOMMENDATIONS | MENU RECOMMENDATIONS |
|---|---|---|
| MENU₁ | KP₁ | MENU_K |
| ... | ... | ... |
| MENU_K | KP₂ | MENU₂ |

BEHAVIOR BASED MENU ITEM RECOMMENDATION AND PRUNING

BACKGROUND

The present invention relates generally to a method, system, and computer program product for menu item pruning. More particularly, the present invention relates to a method, system, and computer program product for behavior based menu item recommendation and pruning.

In computing, a menu is a list of options or commands presented to the user of an application. The user selects one option, also called a menu item, from the list using an input device such as a mouse, trackpad, or arrow keys. Menus are sometimes hierarchically organized, allowing navigation through different levels of the menu structure. Selecting one menu item, indicated by an arrow, expands the item into a submenu with options related to the selected menu item. Selecting some menu items in a submenu expands the item into another submenu, and so on. The term menu, as used herein, also includes both a submenu and a menu item within a menu or submenu unless expressly disambiguated.

SUMMARY

The illustrative embodiments provide a method, system, and computer program product. An embodiment includes a method that aggregates, using historical menu usage data for an application and a set of menu to key process mappings, the historical menu usage data into aggregated key process usage data. An embodiment generates, using the aggregated key process usage data, a set of key process association rules, a key process association rule in the set of key process association rule comprising a consequent key process given a particular antecedent key process. An embodiment generates, from the set of key process association rules and a set of ranked menus by frequency of usage within each key process, a set of model menu recommendations, a model menu recommendation in the set of model menu recommendations comprising a modelled next menu corresponding to a historical menu selection and a confidence value corresponding to the modelled next menu. An embodiment scores, according to an application usage history, a menu frequency ratio, and the confidence value, the set of menu recommendations, the scoring resulting in a scored set of menu recommendations, a scored menu recommendation in the set of scored menu recommendations comprising a scored recommendation of a next menu corresponding to a menu selection, the next menu determined using the set of model menu recommendations. An embodiment prunes, from a set of menu items of the application, a scored menu recommendation having a rank below a threshold rank, the set of scored model menu recommendations ranked according to their scores, the pruning resulting in a pruned set of scored menu recommendations. An embodiment presents, for selection instead of the set of menu items, the pruned set of scored menu recommendations.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 9 depicts a continued example of behavior based menu item recommendation and pruning in accordance with an illustrative embodiment;

DETAILED DESCRIPTION

Figure 1:
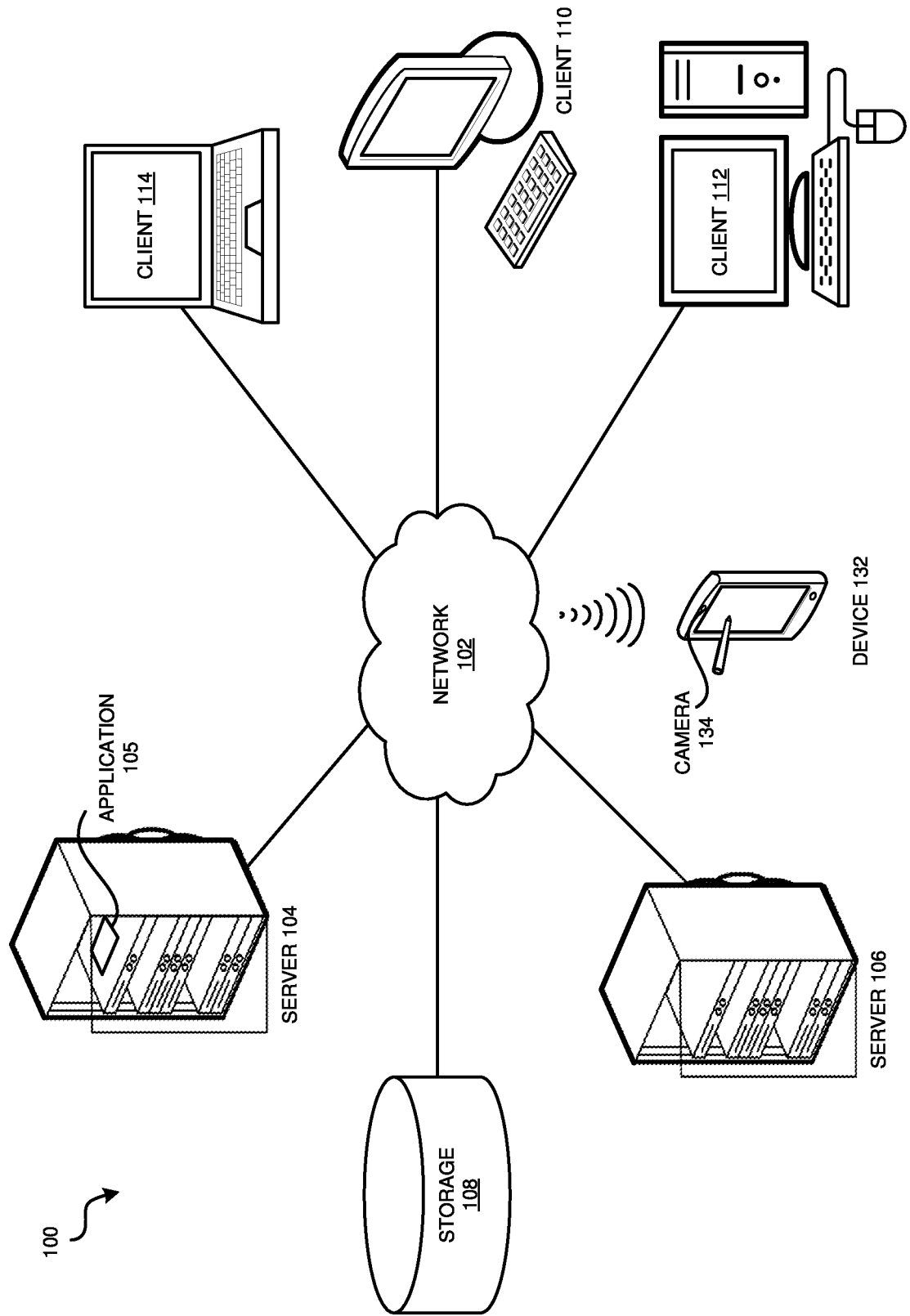
FIG. 1 depicts a block diagram of a network of data processing systems in which illustrative embodiments may be implemented.

The illustrative embodiments recognize that as functionality has been added over time to some menu-based applications, menus, and the menu items within them, have become more complex to provide access to the additional functionality. For example, one commonly used data analysis application includes twenty six options in a first-level data analysis menu, as part of a menu hierarchy three levels deep. The application has more than two hundred menu items in total. The large number of menus and menu items and the deep menu hierarchy makes such an application difficult for a new user to learn and burdensome to use even for an experienced user. Thus, the illustrative embodiments recognize that there is an unmet need to provide menu item recommendations to guide a new user in using the application, and to prune menu items and a menu hierarchy into commonly used menu items, to streamline application use for an existing user.

The illustrative embodiments recognize that the presently available tools or solutions do not address these needs or provide adequate solutions for these needs. The illustrative embodiments used to describe the invention generally address and solve the above-described problems and other problems related to behavior based menu item recommendation and pruning.

An embodiment can be implemented as a software application. The application implementing an embodiment can be configured as a modification of an existing software application or data analysis system, as a separate application that operates in conjunction with an existing software application or data analysis system, a standalone application, or some combination thereof.

Particularly, some illustrative embodiments provide a method that aggregates historical menu usage data of an application into aggregated key process usage data, uses the aggregated key process usage data to generate a set of key process association rules, generates, from the set of key process association rules and a set of ranked menus by frequency of usage within each key process, a set of model menu recommendations, scores the set of menu recommendations, prunes, from a set of menu items of the application, a scored menu recommendation having a rank below a threshold rank, and presents, for selection instead of the set of menu items, the pruned set of scored menu recommendations.

An embodiment analyzes historical menu usage data for an application for which the embodiment is to provide menu item recommendation and pruning. In one embodiment, the historical menu usage data includes data of a user's use of the application. In another embodiment, the historical menu usage data includes data of a community of users' use of the application. In one embodiment, the community includes the user. In another embodiment, the community excludes the user. Community data is helpful in guiding a new user's use of the application by referencing behavior of other, more experienced users. One embodiment monitors users' use of the application, on an opt-in basis, and generates historical menu usage data from the monitoring. Another embodiment receives historical menu usage data from another source.

In particular, historical menu usage data includes a menu operation—a user's selection of a menu—and a timestamp at which the user selection occurred. An embodiment aggregates the menu usage data into a number of times a particular user selected a particular menu on a particular day, or within another time period. For example, on date 1, user A might have selected menu 1 20 times and menu 2 15 times. Another embodiment aggregates the menu usage data into a number of times a particular set, or community, of users selected a particular menu on a particular day, or within another time period. For example, on date 2, community A (including users B and C, but not user A) might have selected menu 1 20 times and menu 2 15 times.

An embodiment classifies, or maps, a menu in the user's or community's menu usage data into one of a set of predetermined key processes. One embodiment uses a set of predefined rules mapping each menu item to a particular key process. One embodiment configured to perform menu recommendation and pruning for a data analysis operation classifies a menu into one of six key processes: (i) import data, (ii) data preprocessing, (iii) data analysis, (iv) view analysis results, (v) export data or results, and (vi) shutdown. For example, an embodiment might classify the "correlate", "regression" "loglinear", and "classify" menus into the data analysis key process. Other embodiments use different numbers of key processes, key processes with different names, or both. Another embodiment treats every menu as a different key process.

An embodiment uses the menu-to-key process mappings to convert aggregated menu usage data into aggregated key process usage data. For example, if menu 1 (used 20 times in a time period) and menu 2 (used 15 times in the same time period) are the only menus in key process 1, key process 1 was used 35 times in the time period.

Within each key process, an embodiment ranks menus by frequency of usage. For example, within key process 1, there might be four menus: the user used menu 4 20 times within the time period, while the user used menu 1 8 times within the time period, and the user did not use the other menus at all during the time period. Thus, menu 4 is ranked first, menu 1 second, and the other menus are tied for third.

An embodiment uses the aggregated key process usage data to generate a set of association rules. An association rule specifies that, if the user selects a menu in a particular key process (an antecedent), there is a specified probability (or confidence), that the next menu selected will be in a particular key process (a consequent). Support refers to a menu selection's frequency of occurrence, used to generate the set of association rule. For example, one association rule might specify that, if a user selects a menu in key process 3, there is a 90% probability that the next menu selected will be in key process 1. One example of a presently available technique for generating a set of association rules from aggregated key process usage data is the apriori algorithm. Other presently available techniques are also usable and contemplated within the scope of the illustrative embodiments.

An embodiment uses the set of association rules and the ranked menus by frequency of usage within each key process to generate a set of model menu recommendations for a user. In particular, an embodiment uses an association rule to determine a consequent key process given a particular antecedent particular key process, then selects the top-ranked menu within the consequent key process as the model menu recommendation for an application user.

An embodiment also converts aggregated menu usage data into aggregated key process usage data, ranks menus within each key process by frequency of usage, generates a set of association rules, and generates a set of model menu recommendations for a community of users, using historical menu usage data of a community of users.

An embodiment computes parameters used to score the model menu recommendation for an application user and those for a community. An embodiment computes a user inclination parameter i that adjusts a menu recommendation according to a user's experience with the application for which menu recommendation and pruning is being performed. In particular, the user inclination parameter i is a linear function of the number of times a user has used the application over a predetermined time period. In one embodiment, i ranges from 0.3 (if this is the user's first use of the application in the predetermined time period) to 0.7. In another embodiment, i ranges from 0 (if this is the user's first use of the application in the predetermined time period) to 1. Other ranges for i are also possible and contemplated within the scope of the illustrative embodiments. An embodiment also computes a frequency ratio $r_u$ as the number of times a user selected a menu within a key process (denoted by f) divided by the number of times a user selected any menu within a key process (denoted by $f_t$), using the key process usage ranking data for the user. An embodiment also computes a frequency ratio $r_c$ as the number of times a community selected a menu within a key process divided by the number of times a community selected any menu within a key process, using the key process usage ranking data for the community.

An embodiment uses the user inclination parameter, frequency ratio, and a confidence value for a model menu recommendation to score the model menu recommendation for an application user and those for a community. In particular, an embodiment computes a user recommendation score $s_u$ for a menu using the expression $s_u = c_u * r_u * i$, where $c_u$ is the confidence value for that model menu recommendation for an application user, as calculated by the association rule for that model menu recommendation. For example, if the menu recommendation is for menu k, with a 90% confidence, menu k's frequency ratio $r_u$ is 20/(20+8) =0.71, and i=0.3, menu k has a recommendation score of 0.9*0.71*0.3=0.19. An embodiment also computes a community recommendation score $s_c$ for a menu using the expression $s_c = c_c * r_c * (1-i)$, where $c_c$ is the confidence value for that model menu recommendation for a community, as calculated by the association rule for that model menu recommendation.

An embodiment uses the scored model menu recommendations to recommend next menus to a user or prune menus offered to a user, removing unrecommended menus to simplify menu selection. In particular, when a user selects a menu, an embodiment scores a menu recommendation corresponding to the selected menu in a manner described herein. One embodiment displays one or more highest-scored recommended next menus corresponding to the selected menu, by pruning recommended menus with ranks below a threshold rank from an original list of selectable menus. Only the highest-scored recommended menus are selectable. Another embodiment displays one or more highest-scored recommended next menus corresponding to the selected menu, but does not alter the selectability of other menus. Another embodiment displays one or more highest-scored recommended next menus corresponding to the selected menu, along with one or more of each recommended menu's recommendation score, confidence value, an indication as to whether the score are from the user or the community, and the age of the current model used to generate recommendations. In one embodiment, the data displayed along with one or more highest-scored recommended next menus corresponding to the selected menu is configurable by a user or administrator.

The manner of behavior based menu item recommendation and pruning described herein is unavailable in the presently available methods in the technological field of endeavor pertaining to application menu management. A method of an embodiment described herein, when implemented to execute on a device or data processing system, comprises substantial advancement of the functionality of that device or data processing system in aggregating historical menu usage data into aggregated key process usage data, using the aggregated key process usage data to generate a set of key process association rules, generating, from the set of key process association rules and the ranked menus by frequency of usage within each key process, a set of model menu recommendations, scoring the set of menu recommendations, pruning, from a set of menu items of the application, a scored menu recommendation having a rank below a threshold rank, and presenting, for selection instead of the set of menu items, the pruned set of scored menu recommendations.

The illustrative embodiments are described with respect to certain types of menus, menu usage data, key processes, aggregations, association rules, forecasts, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
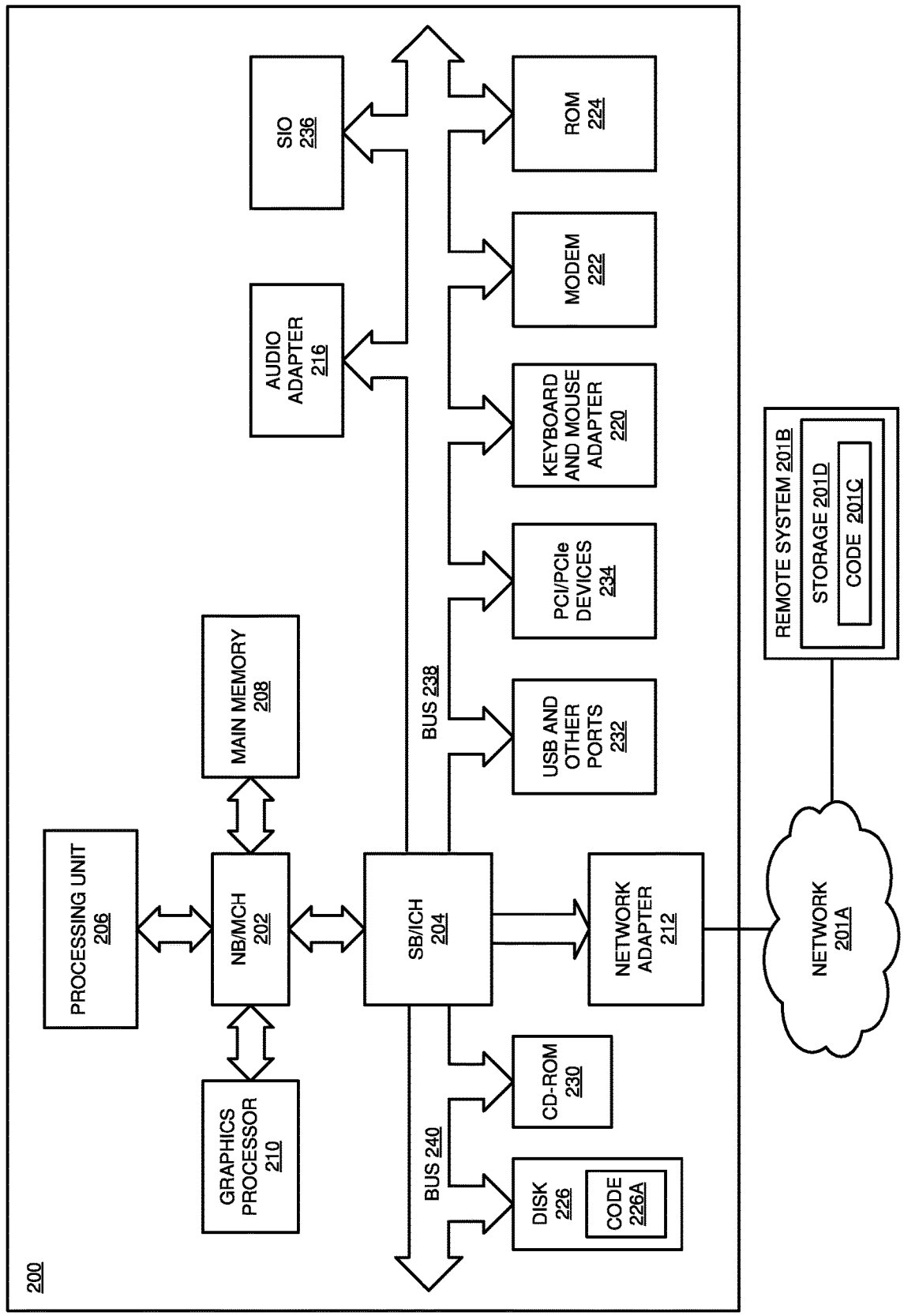
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132, and is usable to process menu usage data of an application executing in the same system or a different system from application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
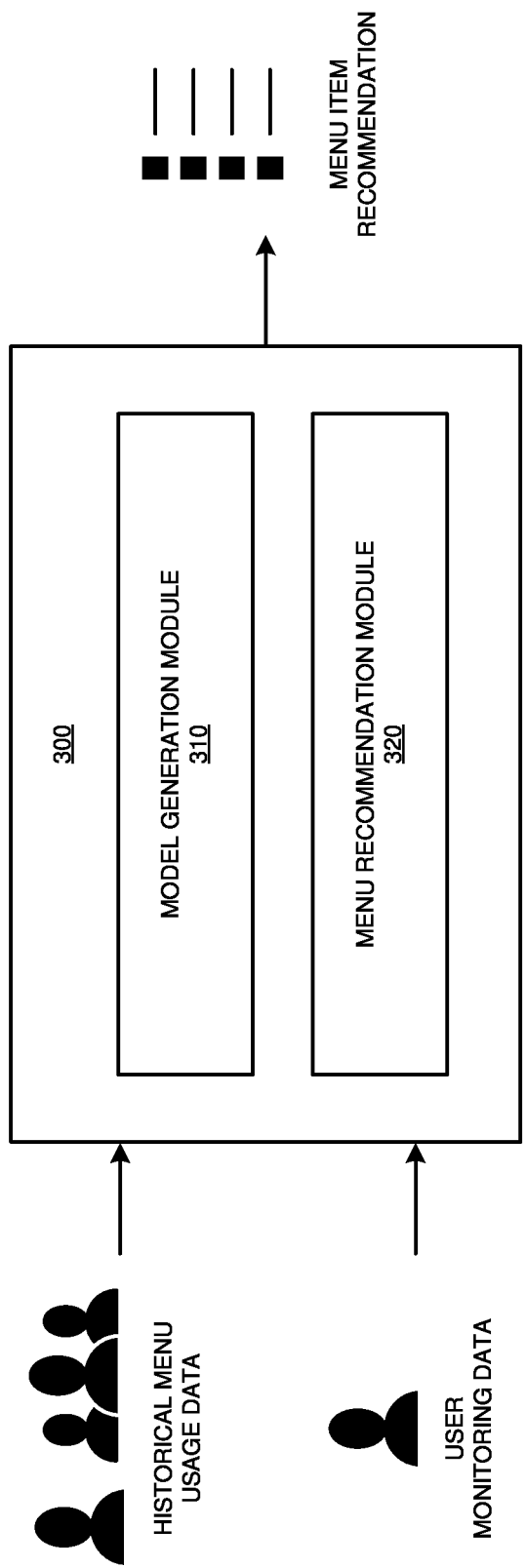
FIG. 3 depicts a block diagram of an example configuration for behavior based menu item recommendation and pruning in accordance with an illustrative embodiment.

With reference to FIG. 3, this figure depicts a block diagram of an example configuration for behavior based menu item recommendation and pruning in accordance with an illustrative embodiment. Application 300 is an example of application 105 in FIG. 1 and executes in any of servers 104 and 106, clients 110, 112, and 114, and device 132 in FIG. 1.

Application 300 receives historical menu usage data for an application for which the embodiment is to provide menu item recommendation and pruning and user monitoring data as a user uses the same application. Historical menu usage data includes data of a user's use of the application, data of a community of users' use of the application, or both. One implementation of application 300 monitors users' use of the application, on an opt-in basis, and generates historical menu usage data from the monitoring. Another implementation of application 300 receives historical menu usage data from another source. In particular, historical menu usage data includes a menu operation—a user's selection of a menu—and a timestamp at which the user selection occurred.

Model generation module 310 converts aggregated menu usage data into aggregated key process usage data, ranks menus within each key process by frequency of usage, generates a set of association rules, and generates a set of model menu recommendations for a community of users, using historical menu usage data of a user and a community of users. Module 310 also computes parameters used to score the model menu recommendation for an application user and those for a community.

Menu recommendation module 320 scores model menu recommendations, and uses the scored model menu recommendations to recommend next menus to a user or prune menus offered to a user, removing unrecommended menus to simplify menu selection. In particular, when a user selects a menu, module 320 scores a menu recommendation corresponding to the selected menu by computing a user recommendation score $s_u$ for a menu using the expression $s_u = c_u * r_u * i$, where $c_u$ is the confidence value for that model menu recommendation for an application user, as calculated by the association rule for that model menu recommendation. Module 320 also computes a community recommendation score $s_c$ for a menu using the expression $s_c = c_e * r_c * (1-i)$, where $c_c$ is the confidence value for that model menu recommendation for a community, as calculated by the association rule for that model menu recommendation. One implementation of module 320 displays one or more highest-scored recommended next menus corresponding to the selected menu, by pruning recommended menus with ranks below a threshold rank from an original list of selectable menus. Only the highest-scored recommended menus are selectable. Another implementation of module 320 displays one or more highest-scored recommended next menus corresponding to the selected menu, but does not alter the selectability of other menus. Another implementation of module 320 displays one or more highest-scored recommended next menus corresponding to the selected menu, along with one or more of each recommended menu's recommendation score, confidence value, an indication as to whether the score are from the user or the community, and the age of the current model used to generate recommendations.

Figure 4:
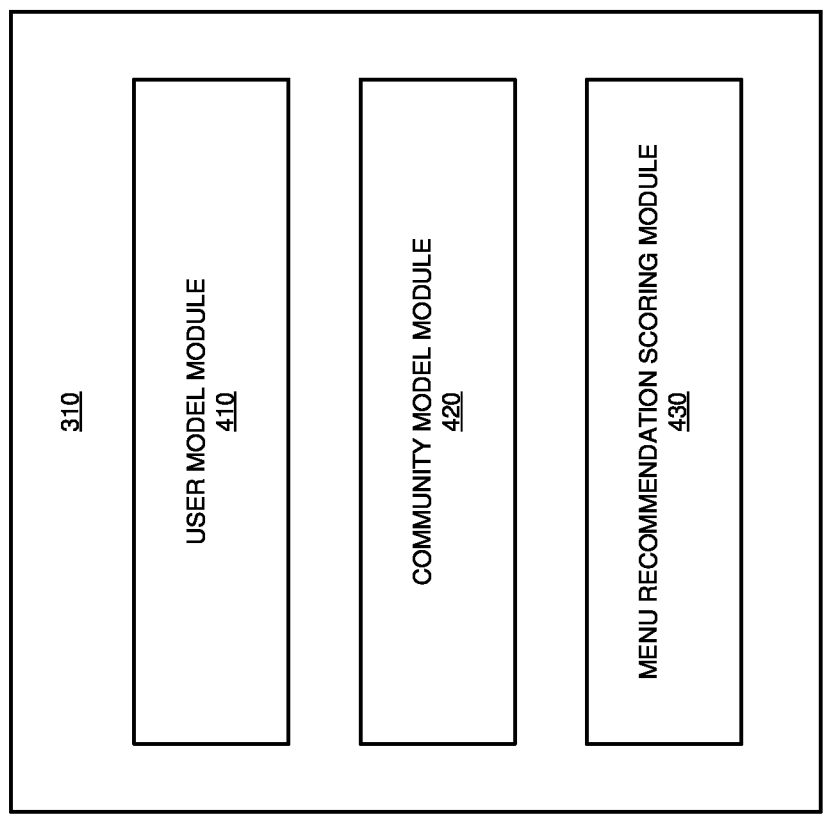
FIG. 4 depicts a block diagram of an example configuration for behavior based menu item recommendation and pruning in accordance with an illustrative embodiment.

With reference to FIG. 4, this figure depicts a block diagram of an example with an illustrative embodiment. In particular, FIG. 4 provides more detail of model generation module 310 in FIG. 3.

User model module 410 converts aggregated menu usage data into aggregated key process usage data, ranks menus within each key process by frequency of usage, generates a set of association rules, and generates a set of model menu recommendations for a community of users, using historical menu usage data of a user.

Community model module 420 converts aggregated menu usage data into aggregated key process usage data, ranks menus within each key process by frequency of usage, generates a set of association rules, and generates a set of model menu recommendations for a community of users, using historical menu usage data of a community of users.

Menu recommendation scoring module 430 scores the model menu recommendation for an application user and those for a community. Module 430 computes a user inclination parameter i that adjusts a menu recommendation according to a user's experience with the application for which menu recommendation and pruning is being performed. In particular, the user inclination parameter i is a linear function of the number of times a user has used the application over a predetermined time period. In one implementation of module 430, i ranges from 0.3 (if this is the user's first use of the application in the predetermined time period) to 0.7. In another implementation of module 430, i ranges from 0 (if this is the user's first use of the application in the predetermined time period) to 1. Other ranges for i are also possible. Module 430 also computes a frequency ratio $r_u$ as the number of times a user selected a menu within a key process (denoted by f) divided by the number of times a user selected any menu within a key process (denoted by $f_t$), using the key process usage ranking data for the user. Module 430 also computes a frequency ratio $r_c$ as the number of times a community selected a menu within a key process divided by the number of times a community selected any menu within a key process, using the key process usage ranking data for the community.

Figure 5:
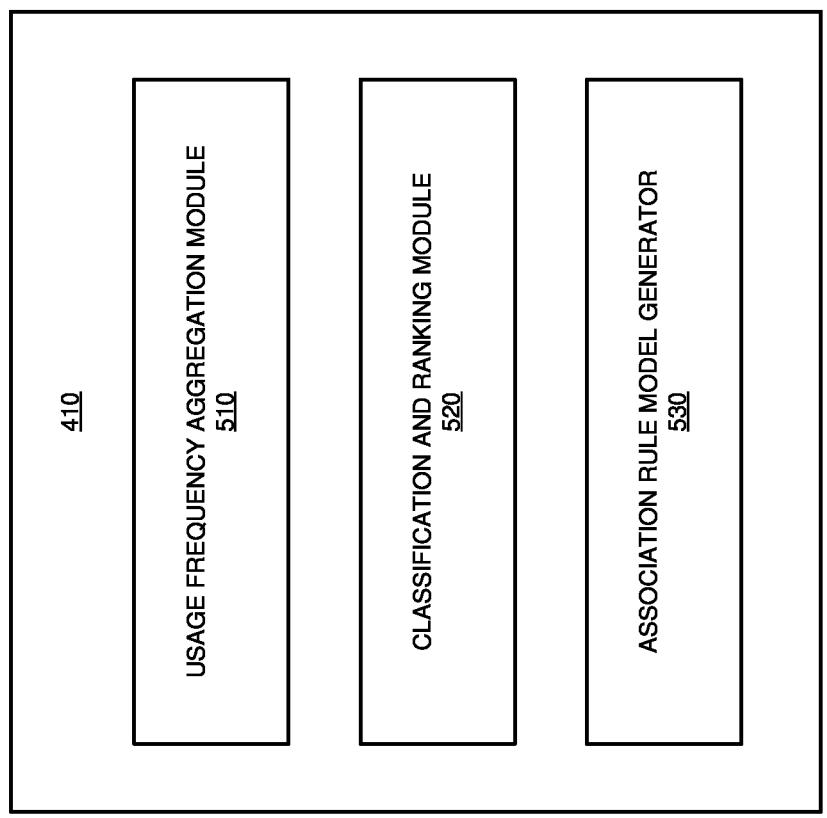
FIG. 5 depicts a block diagram of an example configuration for behavior based menu item recommendation and pruning in accordance with an illustrative embodiment.

With reference to FIG. 5, this figure depicts a block diagram of an example with an illustrative embodiment. In particular, FIG. 5 provides more detail of user model module 410 in FIG. 4.

Usage frequency aggregation module 510 aggregates the menu usage data into a number of times a particular user selected a particular menu on a particular day, or within another time period.

Classification and ranking module 520 classifies, or maps, a menu in the user's menu usage data into one of a set of predetermined key processes. One implementation of module 520 uses a set of predefined rules mapping each menu item to a particular key process. One implementation of module 520 configured to perform menu recommendation and pruning for a data analysis operation classifies a menu into one of six key processes: (i) import data, (ii) data preprocessing, (iii) data analysis, (iv) view analysis results, (v) export data or results, and (vi) shutdown. Other implementations of module 520 use different numbers of key processes, key processes with different names, or both. Another implementation of module 520 treats every menu as a different key process.

Module 520 uses the menu-to-key process mappings to convert aggregated menu usage data into aggregated key process usage data. Within each key process, module 520 ranks menus by frequency of usage.

Association rule model generator 530 uses the aggregated key process usage data to generate a set of association rules. An association rule specifies that, if the user selects a menu in a particular key process (an antecedent), there is a specified probability (or confidence), that the next menu selected will be in a particular key process (a consequent). Support refers to a menu selection's frequency of occurrence, used to generate the set of association rule. Module 530 uses the set of association rules and the ranked menus by frequency of usage within each key process to generate a set of model menu recommendations for a user. In particular, module 530 uses an association rule to determine a consequent key process given a particular antecedent particular key process, then selects the top-ranked menu within the consequent key process as the model menu recommendation for an application user.

Figure 6:
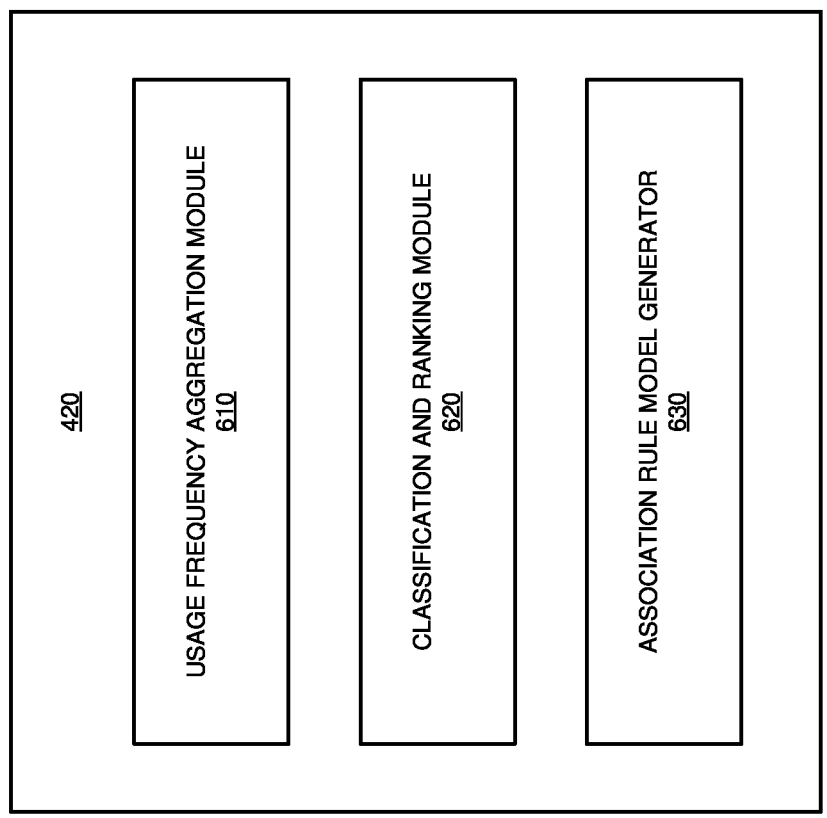
FIG. 6 depicts a block diagram of an example configuration for behavior based menu item recommendation and pruning in accordance with an illustrative embodiment.

With reference to FIG. 6, this figure depicts a block diagram of an example with an illustrative embodiment. In particular, FIG. 6 provides more detail of community model module 420 in FIG. 4.

Usage frequency aggregation module 610 aggregates the menu usage data into a number of times a particular set, or community, of users selected a particular menu on a particular day, or within another time period.

Classification and ranking module 620 classifies, or maps, a menu in the community's menu usage data into one of a set of predetermined key processes. One implementation of module 620 uses a set of predefined rules mapping each menu item to a particular key process. One implementation of module 620 configured to perform menu recommendation and pruning for a data analysis operation classifies a menu into one of six key processes: (i) import data, (ii) data preprocessing, (iii) data analysis, (iv) view analysis results, (v) export data or results, and (vi) shutdown. Other implementations of module 620 use different numbers of key processes, key processes with different names, or both. Another implementation of module 620 treats every menu as a different key process.

Module 620 uses the menu-to-key process mappings to convert aggregated menu usage data into aggregated key process usage data. Within each key process, module 620 ranks menus by frequency of usage.

Association rule model generator 630 uses the aggregated key process usage data to generate a set of association rules specifying that, if a community of users selects a menu in a particular key process (an antecedent), there is a specified probability (or confidence), that the next menu selected will be in a particular key process (a consequent). Module 630 uses the set of association rules and the ranked menus by frequency of usage within each key process to generate a set of model menu recommendations for a community. In particular, module 630 uses an association rule to determine a consequent key process given a particular antecedent particular key process, then selects the top-ranked menu within the consequent key process as the model menu recommendation for a community.

Figure 7:
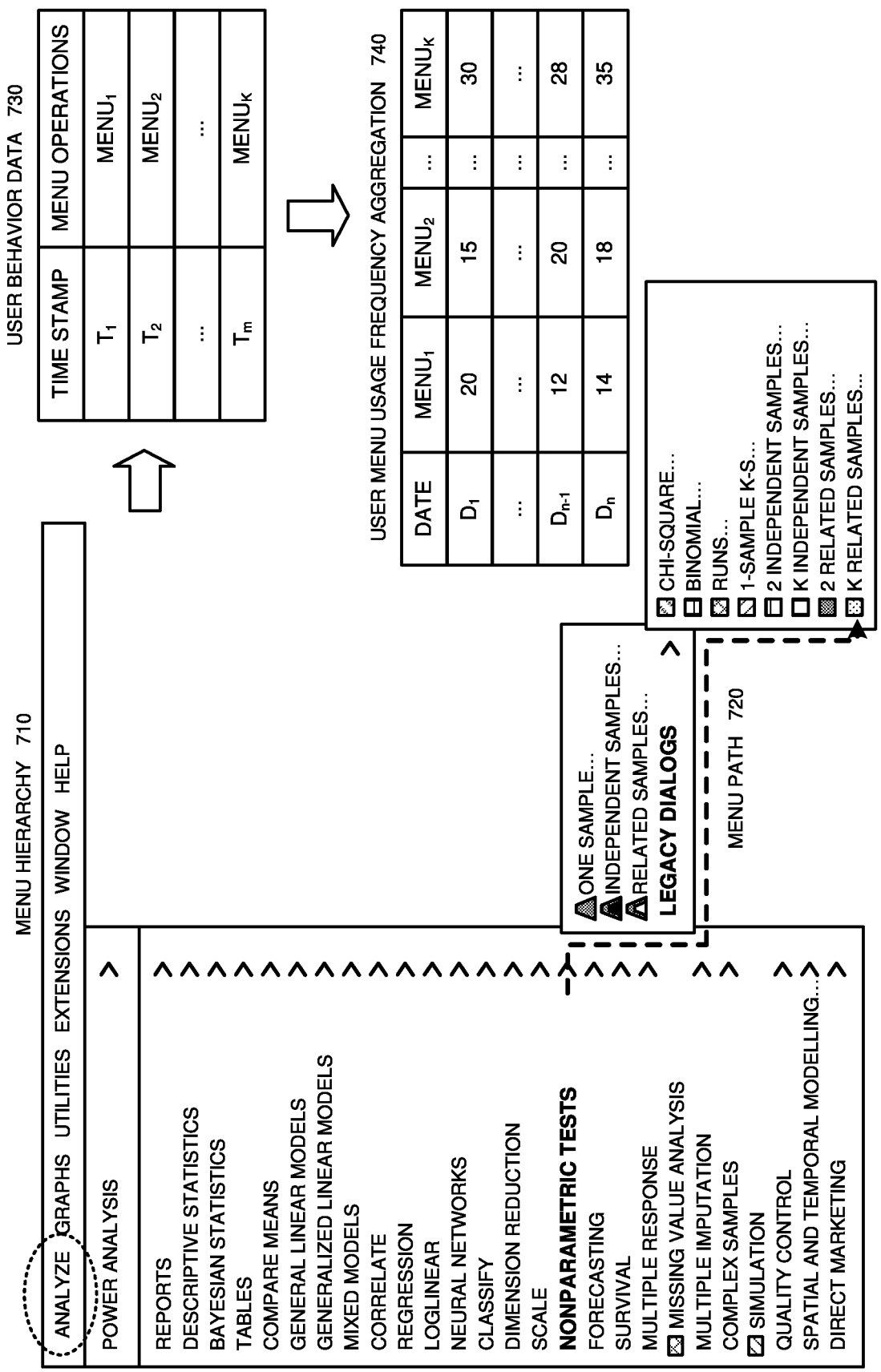
FIG. 7 depicts an example of behavior based menu item recommendation and pruning in accordance with an illustrative embodiment.

With reference to FIG. 7, this figure depicts an example of behavior based menu item recommendation and pruning in accordance with an illustrative embodiment. The example can be executed using Application 300 in FIG. 3.

Menu hierarchy 710 is an example of a menu hierarchy of an application for which application 300 is to provide menu item recommendation and pruning. Menu path 720 depicts an example menu selection path in which a user makes a selection from a set of successively lower level menus. A user's selection of menus in menu path 720, as well as other historical menu usage data, is illustrated in user behavior data 730: data of a user's selection of a menu and a timestamp at which the user selection occurred. Application 300 aggregates user behavior data 730 into user menu usage frequency aggregation 740: a number of times a particular user selected a particular menu in a particular time period.

Figure 8:
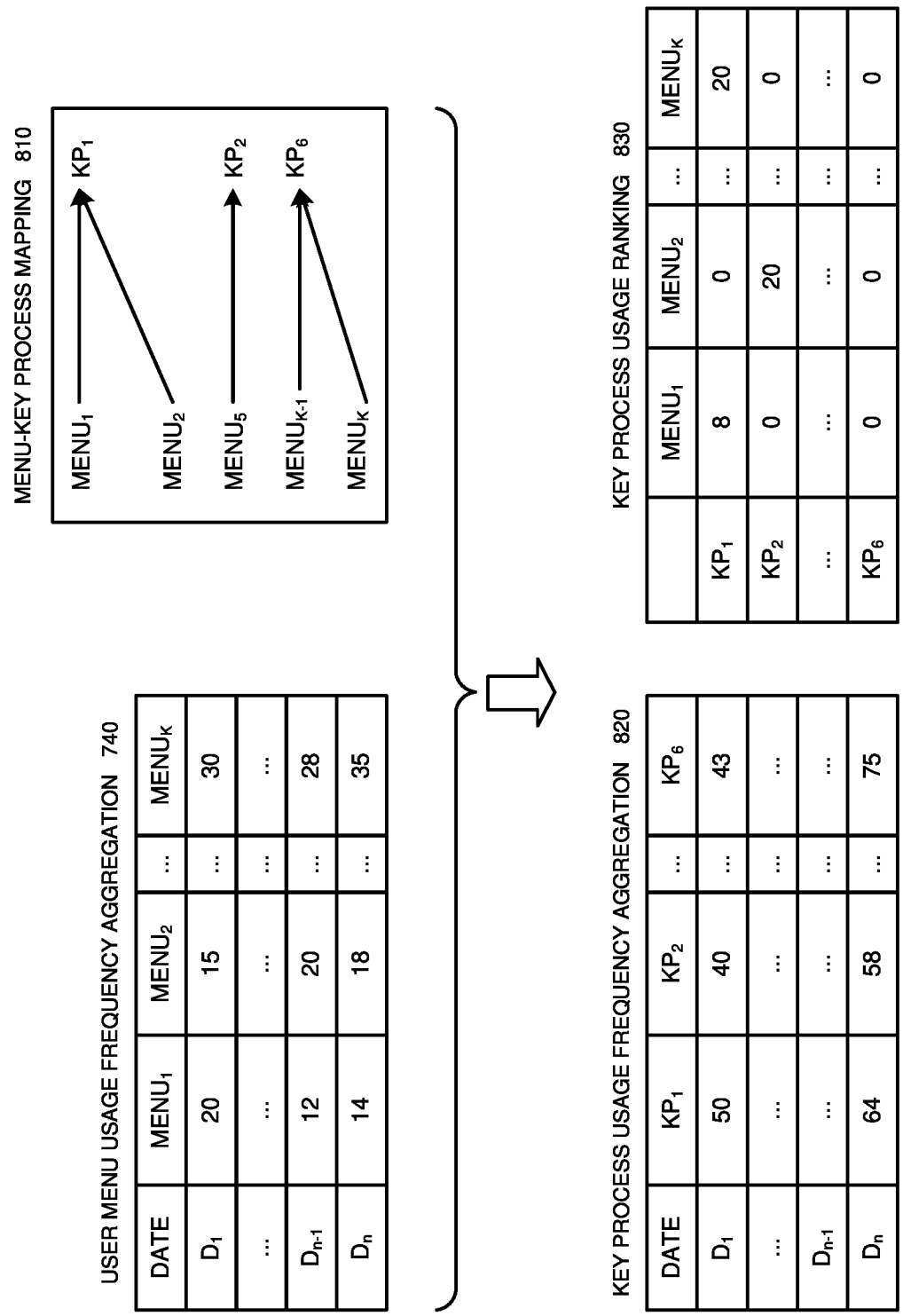
FIG. 8 depicts a continued example of behavior based menu item recommendation and pruning in accordance with an illustrative embodiment.

With reference to FIG. 8, this figure depicts a continued example of behavior based menu item recommendation and pruning in accordance with an illustrative embodiment. User menu usage frequency aggregation 740 is the same as user menu usage frequency aggregation 740 in FIG. 7.

Menu-key process mapping 810 maps menus in the user's or community's menu usage data into one of a set of predetermined key processes. Application 300 uses menu-key process mapping 810 to convert usage frequency aggregation 740 into key process usage frequency aggregation 820: a number of times a particular user selected any menu in a particular key process in a particular time period. For example, if menu 1 (used 20 times in a time period), menu 2 (used 15 times in the same time period) and another menu (not shown in aggregation 740, used 15 times in the same time period) are the only menus in key process 1, key process 1 was used 50 times in the time period, as indicated in the Di row of aggregation 820. Within each key process, application 300 ranks menus by frequency of usage, resulting in key process usage ranking 830.

With reference to FIG. 9, this figure depicts a continued example of behavior based menu item recommendation and pruning in accordance with an illustrative embodiment. Key process usage frequency aggregation 820 and key process usage ranking 830 are the same as key process usage frequency aggregation 820 and key process usage ranking 830 in FIG. 8.

Application 300 uses key process usage frequency aggregation 820 to generate association rules 910: association rules specifying that, if the user selects a menu in a particular key process (an antecedent), there is a specified probability (or confidence), that the next menu selected will be in a particular key process (a consequent). Support refers to a menu selection's frequency of occurrence, used to generate the set of association rule. For example, the top row of association rules 910 specifies that, if a user selects a menu in key process 3, there is a 90% probability that the next menu selected will be in key process 1. Application 300 uses association rules 910 and key process usage ranking 830 to generate model menu recommendations 920 for a user. In particular, application 300 uses an association rule to determine a consequent key process given a particular antecedent particular key process, then selects the top-ranked menu within the consequent key process as the model menu recommendation for an application user. Thus, if an association rules in association rules 910 specifies that the next menu selected will be in key process 1, and menu k is the highest ranked menu in key process 1 (top row of ranking 830), the model menu recommendation corresponding to key process 1 is menu k (top row of model menu recommendations 920).

Figure 10:
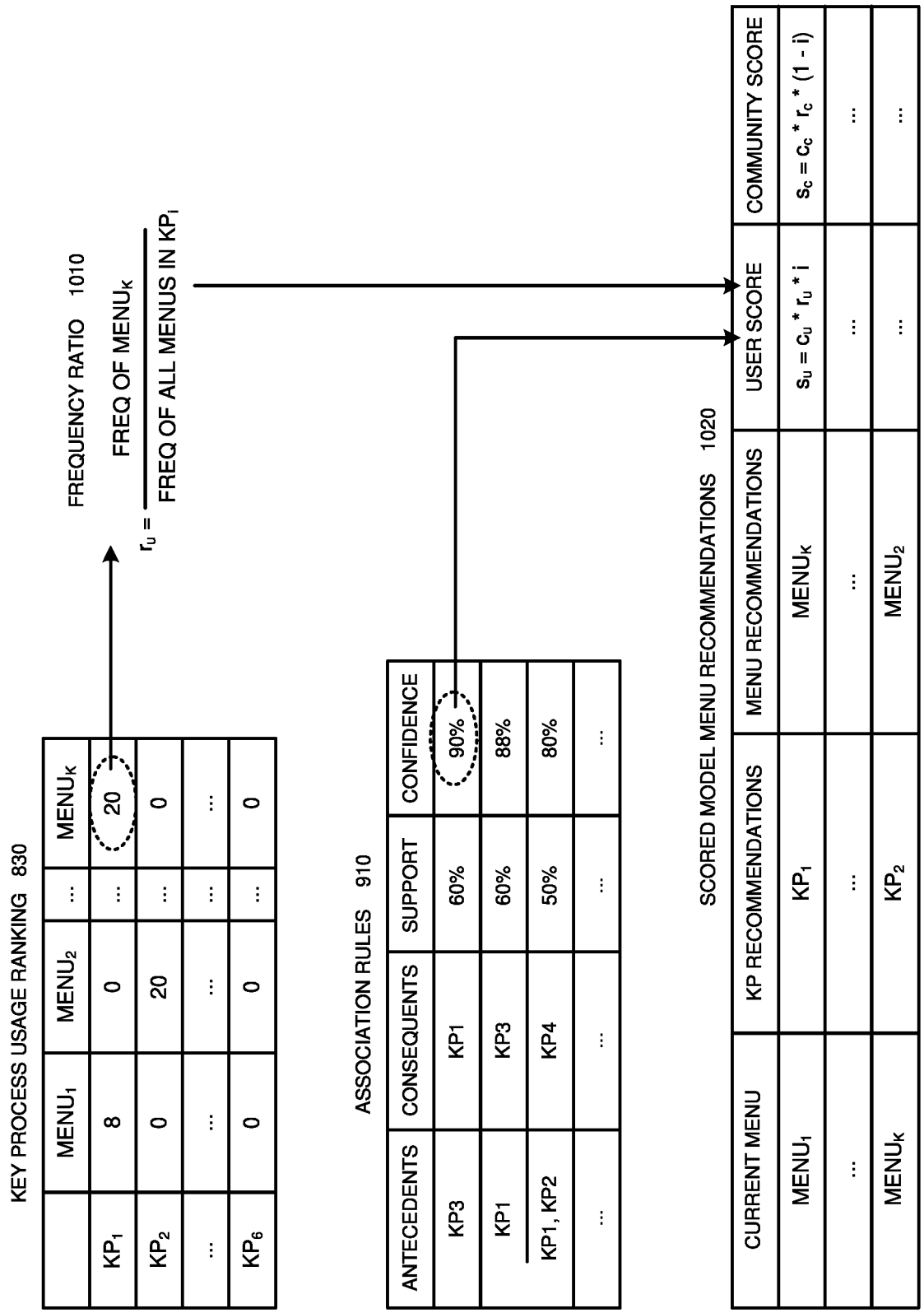
FIG. 10 depicts a continued example of behavior based menu item recommendation and pruning in accordance with an illustrative embodiment.

With reference to FIG. 10, this figure depicts a continued example of behavior based menu item recommendation and pruning in accordance with an illustrative embodiment. Key process usage ranking 830 is the same as key process usage ranking 830 in FIG. 8. Association rules 910 is the same as association rules 910 in FIG. 9.

As depicted, application 300 uses data in key process usage ranking 830 to compute frequency ratio 1010, the number of times a user selected a menu within a key process (denoted by f) divided by the number of times a user selected any menu within a key process (denoted by $f_t$). Application 300 computes a user recommendation score s u for a menu using the expression $s_u=c_u*r_u*i$, where $c_u$ is the confidence value for that model menu recommendation for an application user, as calculated by an entry in association rules 910 for that model menu recommendation. Application 300 also computes a community recommendation score $s_c$ for a menu using the expression $s_c=c_e*r_c*(1-i)$, where $c_c$ is the confidence value for that model menu recommendation for a community, as calculated by the association rule for that model menu recommendation. Score calculations are depicted in scored model menu recommendations 1020.

Figure 11:
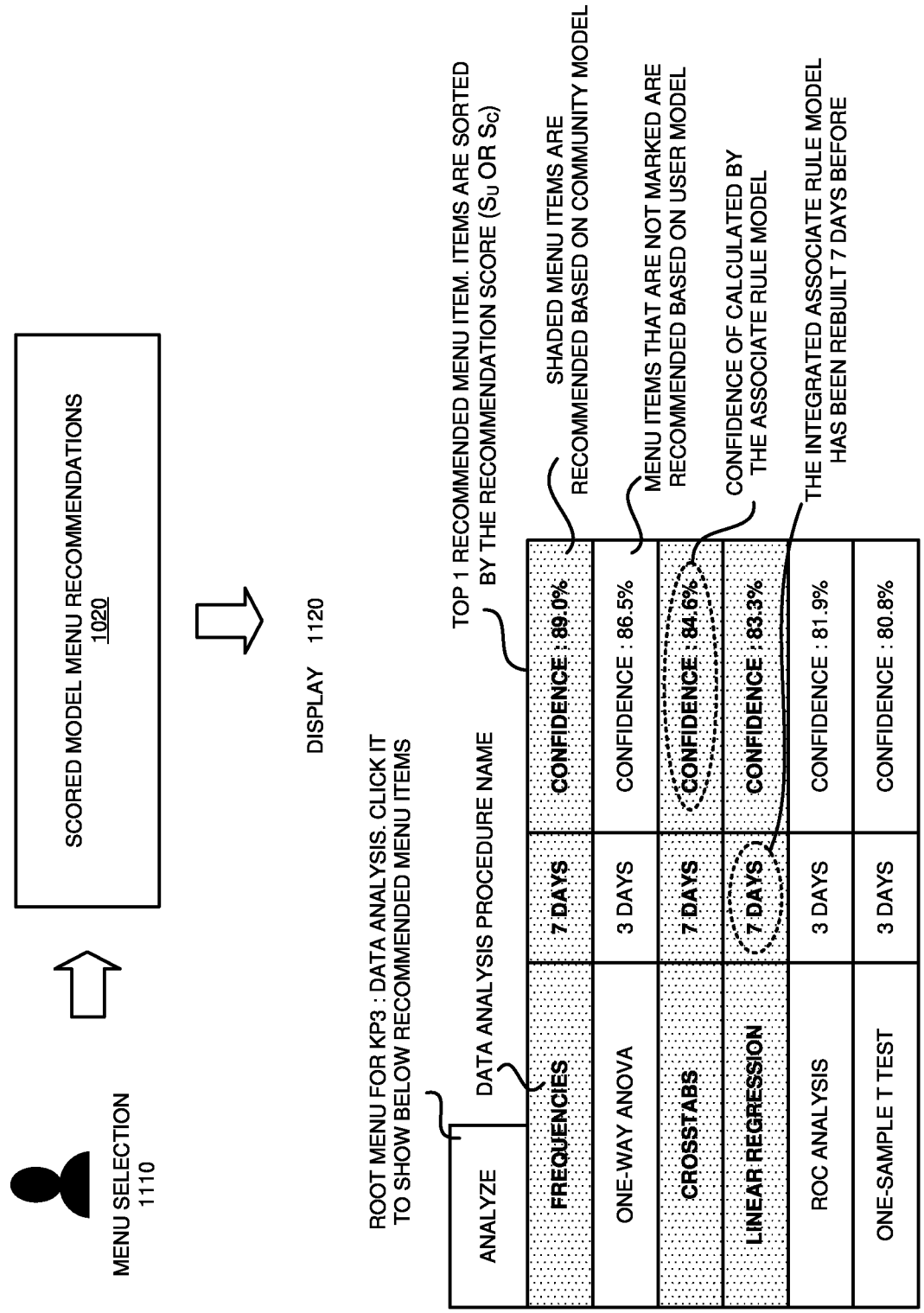
FIG. 11 depicts a continued example of behavior based menu item recommendation and pruning in accordance with an illustrative embodiment.

With reference to FIG. 11, this figure depicts a continued example of behavior based menu item recommendation and pruning in accordance with an illustrative embodiment. Scored model menu recommendations 1020 is the same as scored model menu recommendations 1020 in FIG. 10.

As depicted, a user performs menu selection 1110. Application 300 uses scored model menu recommendations 1020 to generate display 1120, displaying highest-scored recommended next menus corresponding to menu selection 1110, along with one or more of each recommended menu's recommendation score, confidence value, an indication as to whether the score are from the user or the community, and the age of the current model used to generate recommendations.

Figure 12:
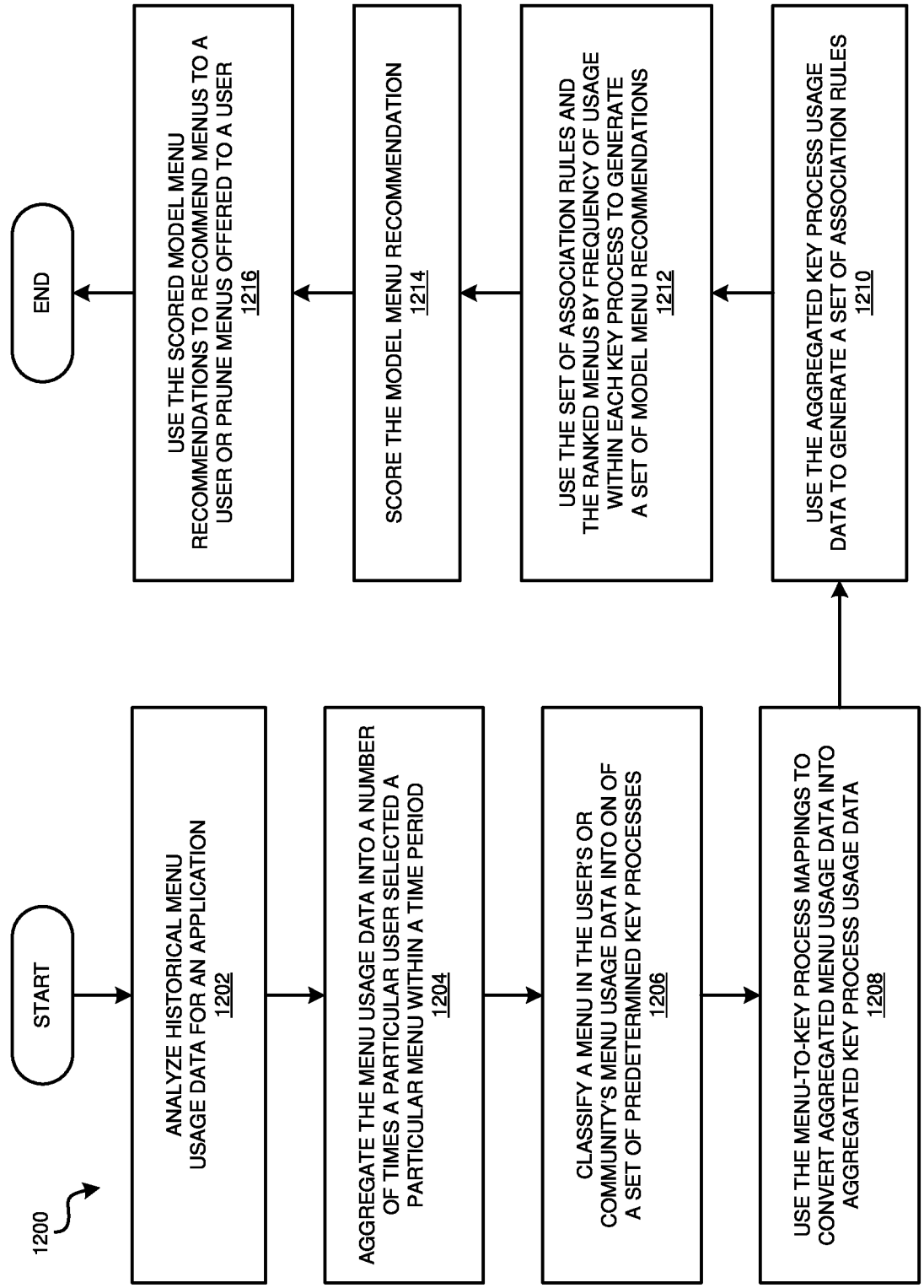
FIG. 12 depicts a flowchart of an example process for behavior based menu item recommendation and pruning in accordance with an illustrative embodiment.

With reference to FIG. 12, this figure depicts a flowchart of an example process for behavior based menu item recommendation and pruning in accordance with an illustrative embodiment. Process 1200 can be implemented in application 300 in FIG. 3.

In block 1202, the application analyzes historical menu usage data for an application. In block 1204, the application aggregates the menu usage data into a number of times a particular user selected a particular menu within a time period. In block 1206, the application classifies a menu in the user's or community's menu usage data into one of a set of predetermined key processes In block 1208, the application uses the menu-to-key process mappings to convert aggregated menu usage data into aggregated key process usage data. In block 1210, the application uses the aggregated key process usage data to generate a set of association rules. In block 1212, the application uses the set of association rules and the ranked menus by frequency of usage within each key process to generate a set of model menu recommendations. In block 1214, the application scores the model menu recommendation. In block 1216, the application uses the scored model menu recommendations to recommend menus to a user or prune menus offered to a user. Then the application ends.

Figure 13:
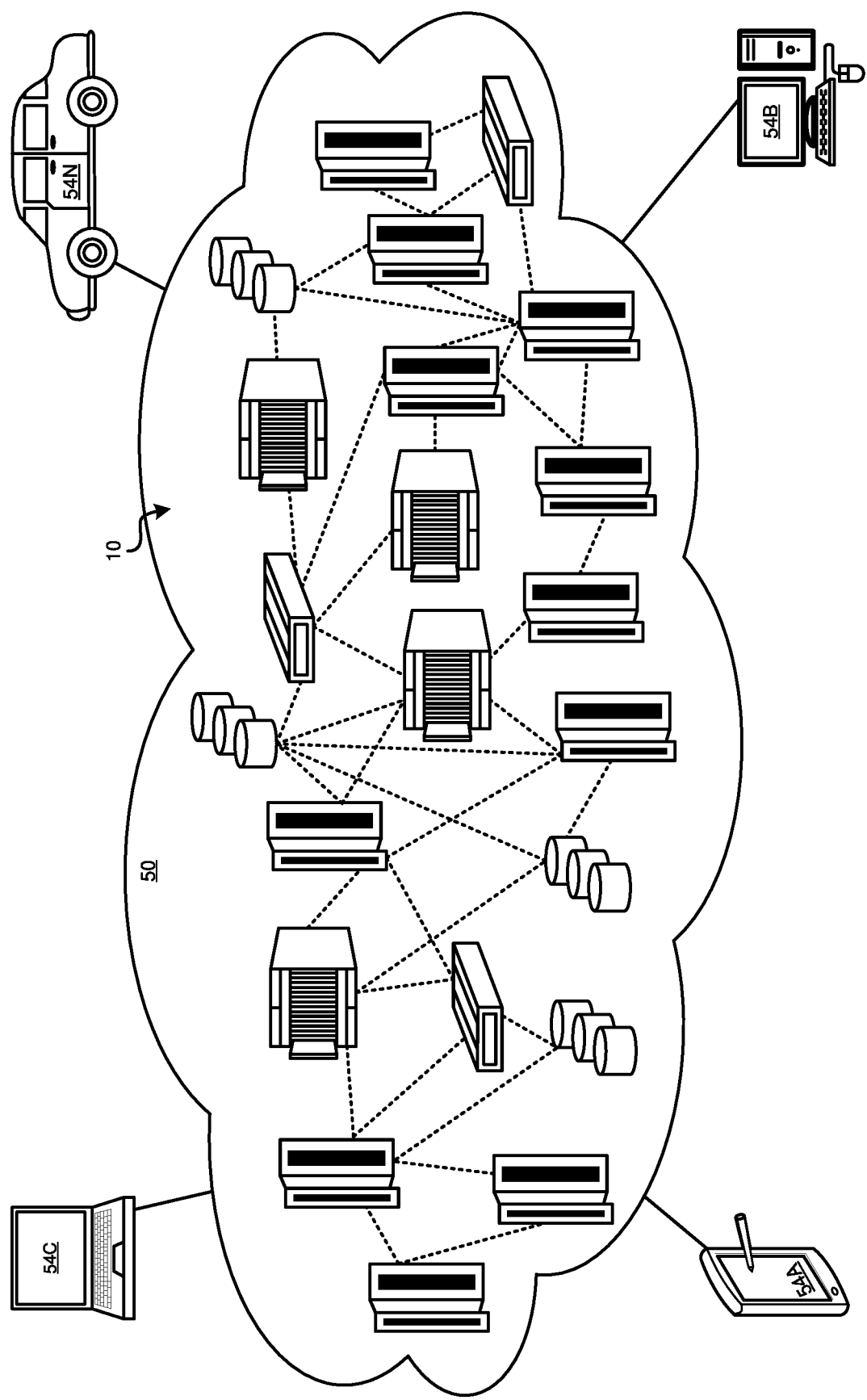
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 14:
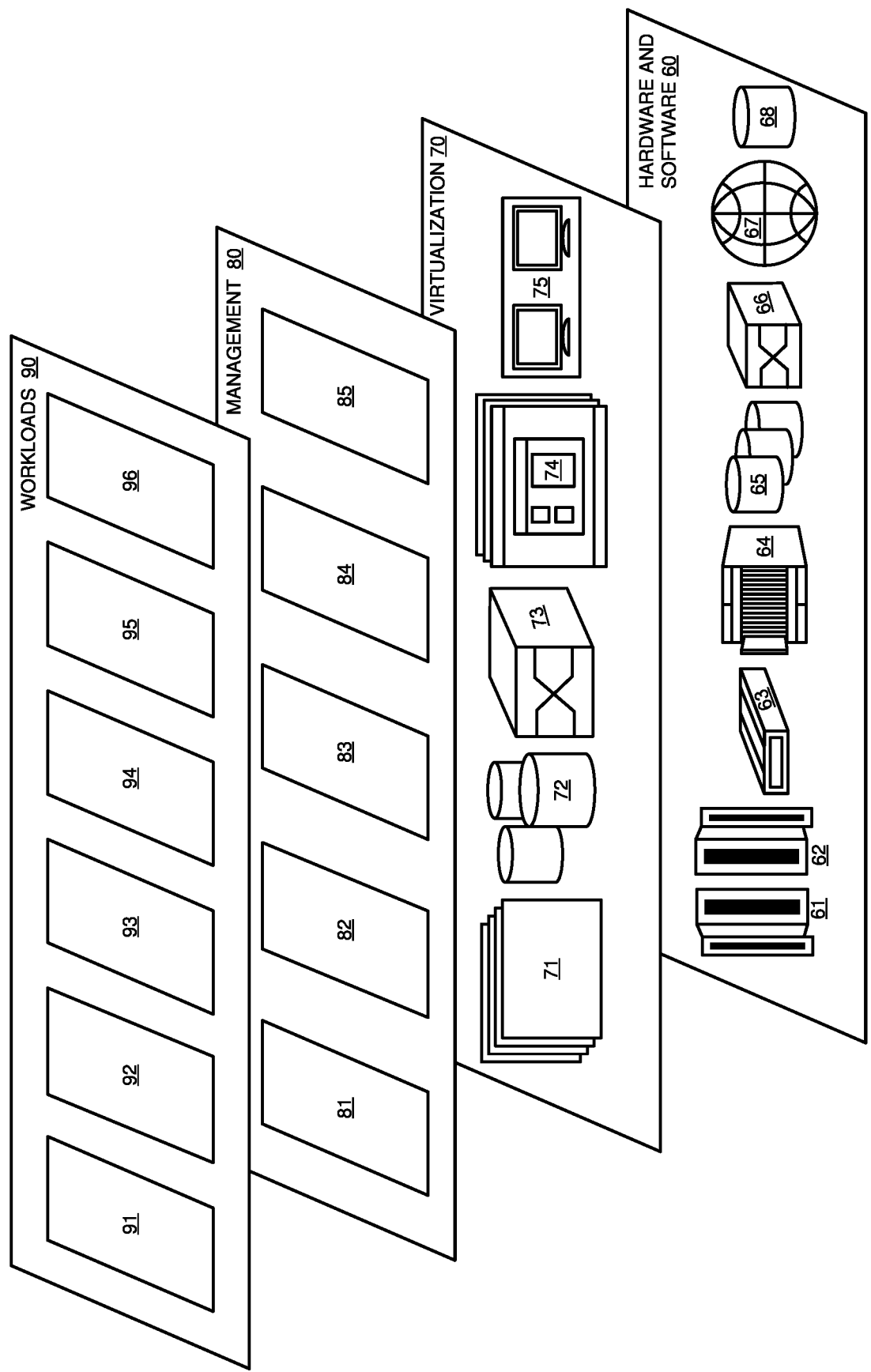
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for behavior based menu item recommendation and pruning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    classifying, using a set of menu to key process mappings, a set of menu items of an application into a set of key processes, wherein a key process in the set of key processes comprises at least two menu items;
    generating, using historical menu usage data for the application and the set of menu to key process mappings, a set of key process association rules, a key process association rule in the set of key process association rule comprising a consequent key process given a particular antecedent key process;
    generating a set of model menu recommendations, a model menu recommendation in the set of model menu recommendations comprising a modelled next menu and a confidence value corresponding to the modelled next menu;
    scoring each menu item from the set of menu items, wherein scoring each menu item is based at least in part on a user inclination parameter, a frequency ratio, and the confidence value associated with each menu item;
    ranking each menu item based on each menu item scored;
    pruning, from the set of menu items of the application, a menu item having a score based rank below a threshold rank, the pruning resulting in a pruned set of scored menu recommendations; and
    presenting, for selection instead of the set of menu items, the pruned set of scored menu recommendations.

2. The computer-implemented method of claim 1, wherein the historical menu usage data comprises a menu selection and a timestamp at which the menu selection occurred.

3. The computer-implemented method of claim 1, wherein a menu to key process mapping in the set of menu to key process mappings comprises a rule mapping a menu selection to a corresponding key process.

4. The computer-implemented method of claim 1, further comprising:
    aggregating, the historical menu usage data into aggregated key process usage data, wherein the aggregated key process usage data comprises a number of times a first user selected a menu in a key process within a time period.

5. The computer-implemented method of claim 4, wherein the aggregated key process usage data comprises a number of times any user in a community of users selected a menu in a key process within a time period.

6. The computer-implemented method of claim 1, wherein the model menu recommendation in the set of model menu recommendations comprises a highest-ranked menu by frequency of usage within the consequent key process.

7. A computer program product for menu item recommendation and pruning, the computer program product comprising:
    one or more computer readable storage media, and program instructions collectively stored on the one or more computer readable storage media, the stored program instructions when executed using a processor causing operations, the operations comprising:
    classifying, using a set of menu to key process mappings, a set of menu items of an application into a set of key processes, wherein a key process in the set of key processes comprises at least two menu items;
    generating, using historical menu usage data for the application and the set of menu to key process mappings, a set of key process association rules, a key process association rule in the set of key process association rule comprising a consequent key process given a particular antecedent key process;
    generating a set of model menu recommendations, a model menu recommendation in the set of model menu recommendations comprising a modelled next menu and a confidence value corresponding to the modelled next menu;

scoring each menu item from the set of menu items, wherein scoring each menu item is based at least in part on a user inclination parameter, a frequency ratio, and the confidence value associated with each menu item;
ranking each menu item based on each menu item scored;
pruning, from the set of menu items of the application, a menu item having a score based rank below a threshold rank, the pruning resulting in a pruned set of scored menu recommendations; and
presenting, for selection instead of the set of menu items, the pruned set of scored menu recommendations.

8. The computer program product of claim 7, wherein the historical menu usage data comprises a menu selection and a timestamp at which the menu selection occurred.

9. The computer program product of claim 7,
wherein a menu to key process mapping in the set of menu to key process mappings comprises a rule mapping a menu selection to a corresponding key process.

10. The computer program product of claim 7, the operations further comprising:
aggregating, the historical menu usage data into aggregated key process usage data, wherein the aggregated key process usage data comprises a number of times a first user selected a menu in a key process within a time period.

11. The computer program product of claim 10, wherein the aggregated key process usage data comprises a number of times any user in a community of users selected a menu in a key process within a time period.

12. The computer program product of claim 7, wherein the model menu recommendation in the set of model menu recommendations comprises a highest-ranked menu by frequency of usage within the consequent key process.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to classify, using a set of menu to key process mappings, a set of menu items of an application into a set of key processes, wherein a key process in the set of key processes comprises at least two menu items;
program instructions to generate, using historical menu usage data for the application and the set of menu to key process mappings, a set of key process association rules, a key process association rule in the set of key process association rule comprising a consequent key process given a particular antecedent key process;
program instructions to generate a set of model menu recommendations, a model menu recommendation in the set of model menu recommendations comprising a modelled next menu and a confidence value corresponding to the modelled next menu;
scoring each menu item from the set of menu items, wherein scoring each menu item is based at least in part on a user inclination parameter, a frequency ratio, and the confidence value associated with each menu item;
ranking each menu item based on each menu item scored;
program instructions to prune, from the set of menu items of the application, a menu item having a score based rank below a threshold rank, the pruning resulting in a pruned set of scored menu recommendations; and
program instructions to present, for selection instead of the set of menu items, the pruned set of scored menu recommendations.

17. The computer system of claim 16, wherein the historical menu usage data comprises a menu selection and a timestamp at which the menu selection occurred.

18. The computer system of claim 16, wherein a menu to key process mapping in the set of menu to key process mappings comprises a rule mapping a menu selection to a corresponding key process.

19. The computer system of claim 16, further comprising:
program instructions to aggregate, the historical menu usage data into aggregated key process usage data, wherein the aggregated key process usage data comprises a number of times a first user selected a menu in a key process within a time period.

20. The computer system of claim 19, wherein the aggregated key process usage data comprises a number of times any user in a community of users selected a menu in a key process within a time period.

* * * * *